United States Patent
Christiansen et al.

(10) Patent No.: US 7,576,880 B2
(45) Date of Patent: Aug. 18, 2009

(54) COOPERATIVE RASTERIZATION OF PRINT DATA IN AN ENTERPRISE NETWORK

(75) Inventors: Robert D. Christiansen, Boise, ID (US); Scott C. Clouthier, Boise, ID (US); Brian E. Hoffmann, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1081 days.

(21) Appl. No.: 10/701,144

(22) Filed: Nov. 3, 2003

(65) Prior Publication Data

US 2005/0094175 A1    May 5, 2005

(51) Int. Cl.
G06F 3/12    (2006.01)
G06F 5/14    (2006.01)

(52) U.S. Cl. ............... 358/1.15; 358/1.1; 358/1.13; 358/1.16

(58) Field of Classification Search ............. 358/1.1, 358/1.13, 1.15, 1.16
See application file for complete search history.

(56) References Cited

U.S. PATENT DOCUMENTS

| | | | | |
|---|---|---|---|---|
| 5,129,049 A | * | 7/1992 | Cuzzo et al. ............... | 358/1.14 |
| 5,619,624 A | * | 4/1997 | Schoenzeit et al. .......... | 345/418 |
| 5,859,711 A | * | 1/1999 | Barry et al. ................. | 358/296 |
| 5,987,226 A | * | 11/1999 | Ishikawa et al. ............ | 358/1.13 |
| 6,100,998 A | * | 8/2000 | Nagao et al. ................ | 358/1.9 |
| 6,577,407 B1 | * | 6/2003 | Kopecki ..................... | 358/1.15 |
| 6,914,692 B1 | * | 7/2005 | Mitani ........................ | 358/1.15 |
| 7,061,649 B2 | * | 6/2006 | Ikeda et al. .................. | 358/1.9 |
| 7,202,964 B2 | * | 4/2007 | Christiansen ............... | 358/1.15 |
| 2002/0102119 A1 | * | 8/2002 | Christodoulou et al. ....... | 400/62 |

FOREIGN PATENT DOCUMENTS

EP    866399 A2 *    9/1998

* cited by examiner

*Primary Examiner*—King Y Poon
*Assistant Examiner*—Lawrence E Wills

(57) ABSTRACT

Systems and methods for cooperative rasterization of print data in an enterprise network are described. In one aspect, a primary printer rasterizes a portion of a print job to input raster bits into a raster buffer associated with the primary printer. During print job processing operations, the primary printer identifies a potential underflow condition of the raster buffer. Thus, the primary printer communicates an un-rasterized portion of the print job to a secondary printer for the secondary printer to rasterize—the primary printer not rasterizing the un-rasterized portion. Subsequently, the primary printer receives raster bits corresponding to the un-rasterized portion from the secondary printer. The primary printer prints all of the raster bits corresponding to the print job.

20 Claims, 10 Drawing Sheets

COOPERATIVE RASTERIZATION OF PRINT DATA IN AN ENTERPRISE NETWORK

TECHNICAL FIELD

The invention relates to the field of networked printing.

BACKGROUND

When a content providing application such as a word processor or a graphics program sends data to a printing device for printing, the data is first converted by a device driver into a page description language (PDL). PDL describes the contents and layout of the data. There are a number of types of PDL, such as Printer Control Language (PCL)®, Portable Document Format (PDF)®, PostScript (PS)®, and so on. Before a PDL can be printed by a printer, the PDL must be converted into device-ready or raster bits. Raster bits instruct a printer's print engine, which is the electronic circuitry controlling the printer's mechanical printing hardware, where to deposit marking agents such as ink or toner that form individual picture elements onto print media. To rasterize PDL, the printer includes a raster image processing (rasterizing) component.

Large print jobs as well as complex print jobs can be substantially time consuming to raster image process (RIP), even for a large commercial-size printer. This is because the rasterization process typically includes some combination of image decompression, color space conversion, half-toning, formatting, and compression operations to convert the PDL to device ready bits. In enterprise networks such as an organizational intranet, the amount of time that it takes to print a print job is generally of paramount importance. Time consuming rasterizing operations may tie up an enterprise's printer causing one or more user's substantial time delays as they wait for a print job to complete. For this reason, rasterizing large and/or complex print jobs in an enterprise network can be a costly undertaking.

To address this problem, one existing technique involves splitting a large and/or complex print job into multiple respective partitions. Respective ones of the partitions are then sent to different networked printers for rasterizing and printing. That is, each printer that RIPs a particular partition will also print that particular partition. Although this technique has effectively reduced the amount of rasterizing that any one printing device is required to perform to RIP a large and/or complex print job, this technique has a number of problems associated with it. For instance, since the print job is raster image processed (""RIP'd"", or ""rasterized"") and printed at multiple different printers, a human being is typically required to gather the printed output from each of these multiple printers. As can be appreciated, this could become a considerably time consuming job to perform, especially as the numbers of printers across which a print job is distributed increases, and when one or more of the printers are geographically distant with respect to any other of the printers.

SUMMARY

Systems and methods for cooperative rasterization of print data in an enterprise network are described. In one aspect, a primary printer rasterizes a portion of a print job to input raster bits into a raster buffer associated with the primary printer. During print job processing operations, the primary printer identifies a potential underflow condition of the raster buffer. Thus, the primary printer communicates an un-rasterized portion of the print job to a secondary printer for the secondary printer to rasterize—the primary printer not rasterizing the un-rasterized portion. Subsequently, the primary printer receives raster bits corresponding to the un-rasterized portion from the secondary printer. The primary printer prints all of the raster bits corresponding to the print job.

BRIEF DESCRIPTION OF THE DRAWINGS

The detailed description is described with reference to the accompanying figures. This section as well as the remaining section of the specification may utilize the term ""exemplary"", which for purposes of discussion, indicates an embodiment (i.e., but one possible implementation) of the object that is being modified by the term.

FIG. 2 shows a number of objective criteria indicating that a particular number of secondary printers would keep a primary printer's print engine from going into a stall situation.

FIG. 7 shows an exemplary procedure for a primary printer to determine whether it is advantageous to utilize at least one secondary printer to assist in rasterizing a print job. FIG. 8 shows further aspects of the exemplary procedure 700 of FIG. 7 for the primary printer to cooperatively rasterize print data in an enterprise network via one or more secondary printers. FIG. 9 shows the operations of the print engine 112 of the primary printer 106-1. FIG. 10 shows the operations of a secondary printer to cooperatively RIP a portion of a print job for subsequent insertion into a primary printer's raster buffer.

DETAILED DESCRIPTION

An Exemplary Operating Environment

Figure 1:
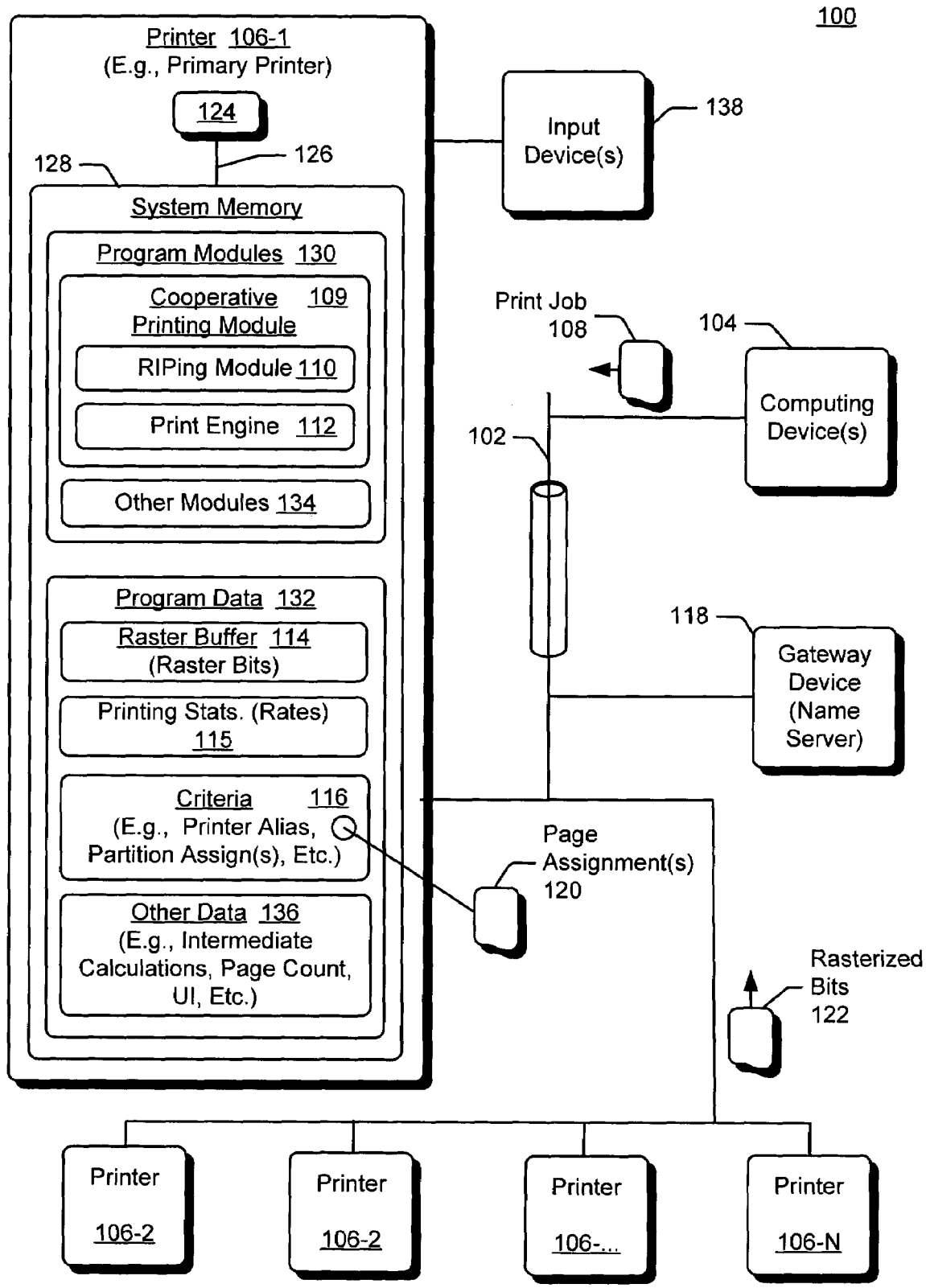
FIG. 1 is an exemplary suitable computing environment within which systems, apparatuses and methods to cooperatively rasterize print data in an enterprise network may be implemented.

Turning to the drawings, wherein like reference numerals refer to like elements, the invention is illustrated as being implemented in a suitable computing environment. FIG. 1 is an exemplary suitable computing environment 100 within which systems, apparatuses and methods for cooperative ras-"

ter image processing in an enterprise may be implemented. Exemplary computing environment 100 is only one example of a suitable computing environment and is not intended to suggest any limitation as to the scope of use or functionality of systems and methods the described herein.

Although not required, the invention is described in the general context of computer-executable instructions, such as program modules executed in a distributed computing environment by a computer. Program modules generally include routines, programs, objects, components, data structures, etc., that perform particular tasks or implement particular abstract data types. In a distributed computing environment, program modules may be located in both local and remote memory storage devices.

As shown in FIG. 1, the exemplary computing environment 100 utilizes communication path 102 to couple one or more computing device(s) 104 to multiple printers 106-1 through 106-N. The communication path 102 represents any type of physical or wireless network communication infrastructure deployed, for example, in an enterprise network or organizational Intranet. The primary printer communicates with the secondary printers over the communication path 102 via respective network addresses (e.g., Internet Protocol (IP) addresses). In one implementation, the primary printer is configured with such IP addresses by an administrative entity. In another implementation, the primary printer obtains such IP address(es) from the gateway device 118.

A computing device 104 includes a printer driver (not shown) to convert digital data into a print job 108. The print job 108 encapsulates PDL that describes content and layout of the print job. In one implementation, the print job 108 includes a page count of the content and a page size. The computing device 104 transmits the print job 108 across the communication path 102 to a "primary printer"—a particular one of the printers 106-1 through 106-N, for printing. The primary printer is the particular one printer of the printers 106-1 through 106-N that is targeted by the computing device 104 to receive the print job 108. By the same token, each of the other printers which were not targeted by the computing device to receive the print job is respectively referred to as a "secondary printer". For purposes of discussion, printer 106-1 is selected to be the primary printer, although any of the other printers could have also been selected as the primary printer. Accordingly, in this implementation, printers 106-2 through 106-N are referred to as secondary printers since they are not the primary printer.

The primary printer 106-1 includes cooperative printing module (CPM) 109 to print a print job 108. To this end, the CPM 109 includes, for example, rasterizing (RIPing) module 110 to RIP the print job 108 into device ready bits (i.e., raster bits) that are stored into raster buffer 114 for subsequent printing, and a print engine 112 to remove the raster bits from the raster buffer 114 as it prints the raster bits. The RIPing module 110 is configured to RIP an average sized and/or non-complex print job 108 at a rate that is sufficiently fast enough to allow its print engine 112 to print at a rated speed without encountering underflow conditions in the raster buffer 114 (i.e., an empty raster buffer 114). Such underflow conditions would interrupt the continuity of the printing operations while the print engine waited for raster bits to become available for printing.

However, certain print jobs 108, such as a large and/or complex print job, may reduce the rate at which RIPing module 110 can RIP the print job 108 into raster bits. In such a situation, and if raster bits are being consumed by the print engine 112 faster than the raster bits are being generated by the RIP Module 110, the raster buffer 114 would eventually underflow and the print engine 112 would not have any raster bits to pull from the raster buffer 114 (i.e., starving the print engine of raster bits to print). If the raster buffer 114 becomes empty (underflows), then the print engine 112 will stall causing an increase in the amount of time that it will take to complete the printing operation.

Objective Criteria for Cooperative Rasterization Decisions

The CPM 109 determines in real time (i.e., as printing operations occur), whether its RIPing module 110 is rasterizing the print job 108 fast enough to keep the raster buffer 114 from underflowing. If not, the CPM evaluates whether enlisting assistance of at least one secondary, or "helper" printer 106-2 through 106-N to help RIP the print job 108 would be advantageous. Such an enlisted secondary printer would rasterize some of the un-rasterized portions of the print job for subsequent addition to the primary printer's raster buffer 114. If sending one or more un-rasterized portions of the print job 108 to the at least one secondary printer for rasterization and transmission of corresponding raster bits back to the primary printer for subsequent insertion into the primary printer's raster buffer will be faster than allowing the CPM 109 to rasterize the print job by itself (i.e., permitting raster buffer underflow), then the primary printer will so enlist the help of one or more such secondary printers. To make such determinations, the CPM 109 determines or estimates a number of objective criteria including, for example:

The amount of time that it takes to rasterize a specifically sized portion of the print job. For purposes of discussion the amount of time is often referred to as the "RIPtime". In this implementation, the specifically sized portion is a page. However, in a different implementation, the specifically sized portion may be smaller (e.g., a collection of some number of rows of data) or greater than a page of the print job 108. The amount of time that is takes the primary printer's print engine 112 to print a page of rasterized data from the raster buffer 114. This amount of time is often referred to as the "PrintEngineTime".

The amount of time that it would take a secondary printer to receive a portion of the print job 108 from the primary printer. This amount of time is often referred to as the "transmit time".

The amount of time that it would take the secondary printer to return the corresponding raster data to the primary printer. This amount of time is often referred to as the "receive time".

Primary print engine idle time. This is the time where no raster data is available for the print engine to use to generate printed material.

RIPtime

With respect to determining RIPtime (i.e., the amount of time that it takes the primary printer 106-1 to RIP a page of the print job 108), the CPM 109 of the primary printer empirically determines the RIPtime by calculating the average amount of time that the primary printer takes to RIP the first number of pages of the print job 108. In this implementation, it is assumed that each page of the remaining un-rasterized pages of the print job will take the same amount of time to RIP. A continuous recalculation of the average RIPtime will help mitigate the spikes that can occur in normal print jobs. A secondary printer is considered to RIP a page at a rate equal to the average amount of time (RIPtime) that it took the primary printer's RIPing module 110 to RIP a page.

PrintEngineTime

An exemplary formula for determining how fast a primary printer's print engine 112 will consume a page of raster bits from a raster buffer 114 (the PrintEngineTime) is now described with respect to an exemplary configuration of the primary printer 106-1. In this example, the primary printer 106-1 is configured with a vertical resolution of 600 dots per inch (DPI), a horizontal resolution of 600 DPI, four color planes (cyan, magenta, yellow, black) with 8 bits per plane, and a printing speed of 24 pages per minute (ppm) where each page is assumed to be a letter page (8.5×11") with the feed direction being along the long axis of the paper. (The primary printer 106-1 may have such a configuration or a different configuration). With this configuration, and at 24 ppm, a single row of data in this example consists of (8.5 inches*600 DPI=) 5100 dots. With 4 color planes, this equates to 32 bits of data for each dot, or 4 bytes. This means that there will be 4×5100=20,400 bytes/row. A letter sheet of paper for this configuration will include 11 inches*600 DPI=6600 rows of dots, or pixels. So, each sheet of paper (i.e., page of the print job 108) may require up to 134,640,000 bytes (6600 rows*20, 400 bytes/row) or approximately 128 Mbytes of raster data (device/print engine ready bits). This means that at 24 ppm, a sheet of paper will be processed by the exemplary print engine every 2.5 seconds. Given that 128 Mbytes of raster data could be required for every page, and that a page goes through the engine every 2.5 seconds, the print engine is estimated to consume 52 Mbytes of data every second from the raster buffer 114.

In light of the above, the following equation is used to estimate the number of Mbytes a print engine 112 requires per second:

$$\left[ \frac{\left( \begin{array}{c} horizontalIDPI \cdot horizontalLength \cdot colorPlanes \cdot \\ bitsPerColorPlane \cdot verticalDPI \cdot verticalLength \\ \hline 8 \; bitsPerByte \cdot 1024 \; bytesPerKB \cdot 1024 \; KBPerMB \end{array} \right)}{(60 \; secPerMinute/SpeedInPagesPerMinute)} \right]. \quad (1)$$

Use of a secondary printer 106-2 through 106-N by a primary printer 106-1 to help RIP one or more portions of the print job 108 are beneficial only if the average time to RIP a single page is greater than the average time to print a single page.

Transmit and Receive Times

We now describe an exemplary technique to estimate an amount of time that it would take a secondary printer 106-2 through 106-N to receive a portion of the print job 108 (transmit time) from the primary printer 106-1, and an amount of time that it would take the secondary printer to return the corresponding raster data (receive time) to the primary printer. As above, the size of the portion of this implementation is a page, but could also represent some other amount of un-rasterized data (e.g., PDL data of some sort, like PCL or PostScript). Initially, network data transfer times between the primary printer 106-1 and respective ones of the secondary printers 106-2 through 106-N can be set up from developmental heuristics derived from the communication path 102 (FIG. 1) being used, and/or connection characteristics of the primary printer to the network 102. For example, A 100 Mbit network card (not shown) provides between 5 and 15 Mbytes of data throughput a second. A Gbit network card provides between 50 and 150 Mbytes of data a second.

As time goes on, network transfer and receive time values are persisted and adjusted/modified based on encountered network transmission/reception times. In one implementation, the primary printer 106-1 calculates and maintains running averages of network transmission and receive time(s) for each secondary printer 102-2 through 102-N, as well as an overall network transmission time average. Such persisted information is be archived in respective portions of "other data" 136 of FIG. 1.

IdleTime

Print engine idle time (IdleTime) is equivalent to the amount of time the primary printer's print engine 112 waits for raster bits to be provided to the raster buffer 114. Essentially, this is equal to the amount of time it takes to the RIPing module 110 to RIP a single page of raster bits minus the amount of time it takes the print engine 112 to print the page of raster bits. For example, if it takes 4 seconds to RIP a single page of data and 2.5 seconds for the print engine to print the page of data, then the idle time is equal to 1.5 seconds.

Identifying a Substantially Optimal Number of Secondary Printers

Upon detecting the potential for raster buffer underflow—any time when the RIP time exceeds the Print time for a single page—and utilizing the objective time estimates described above, the primary printer's CPM 109 now identifies the number of secondary printers 106-2 through 106-N, if any, that may be utilized to keep the primary print engine 112 from stalling. For instance, if the calculated receive time plus the transmit time is greater than the amount of time that it would take the print engine 112 to print a single page (PrintEngineTime), then stalling will not be completely prevented. Yet in this scenario, the stall time can be minimized by utilizing the rasterizing resources of one or more secondary printer(s) to assist filling the primary printer's raster buffer 114 with raster bits. However, if the time for the primary printer to transmit un-rasterized data to a secondary printer plus the time for the primary printer to receive post-RIP data (raster bits) from a secondary printer is less than or equal to the amount of time that the print engine 112 would sit idle (idle time), then a set of secondary printers can work in conjunction with the primary printer to prevent the primary printer's raster data buffer 114 from ever underflowing.

A substantially optimal number of secondary printers 106-2 through 106-N (SecondaryPrinterCount) to be utilized by the primary printer 106-1 to assist in rasterizing a print job 108 is determined according to the following equation:

$$SecondaryPrinterCount = \left\lceil \frac{RipTime - PrintEngineTime}{PrintEngineTime} \right\rceil. \quad (2)$$

Figure 2:
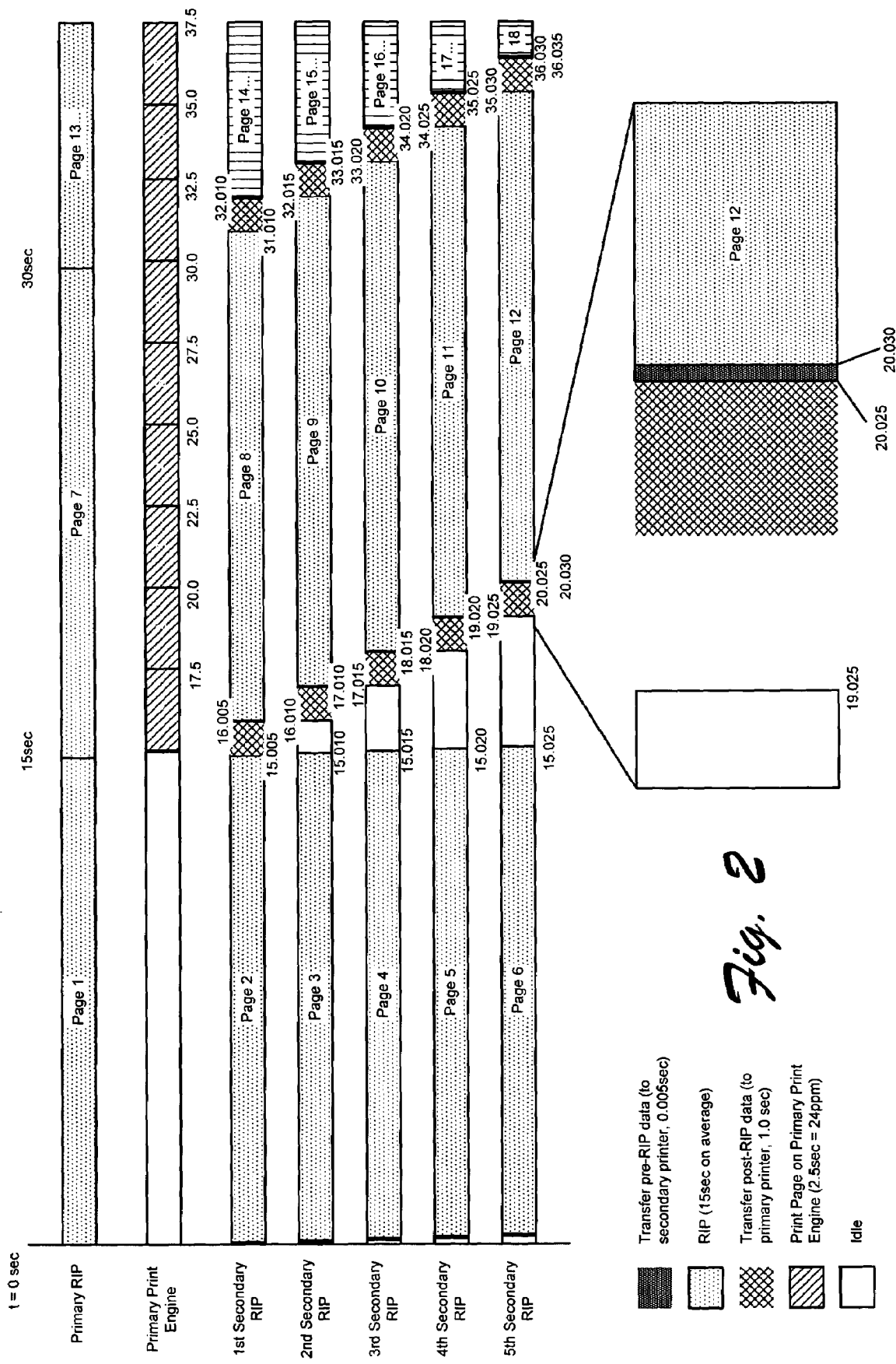
FIG. 2 illustrates various criteria evaluated by the primary printer to determine how many secondary printers to utilize to cooperatively rasterize print data in an enterprise network. In particular.
Figure 3:
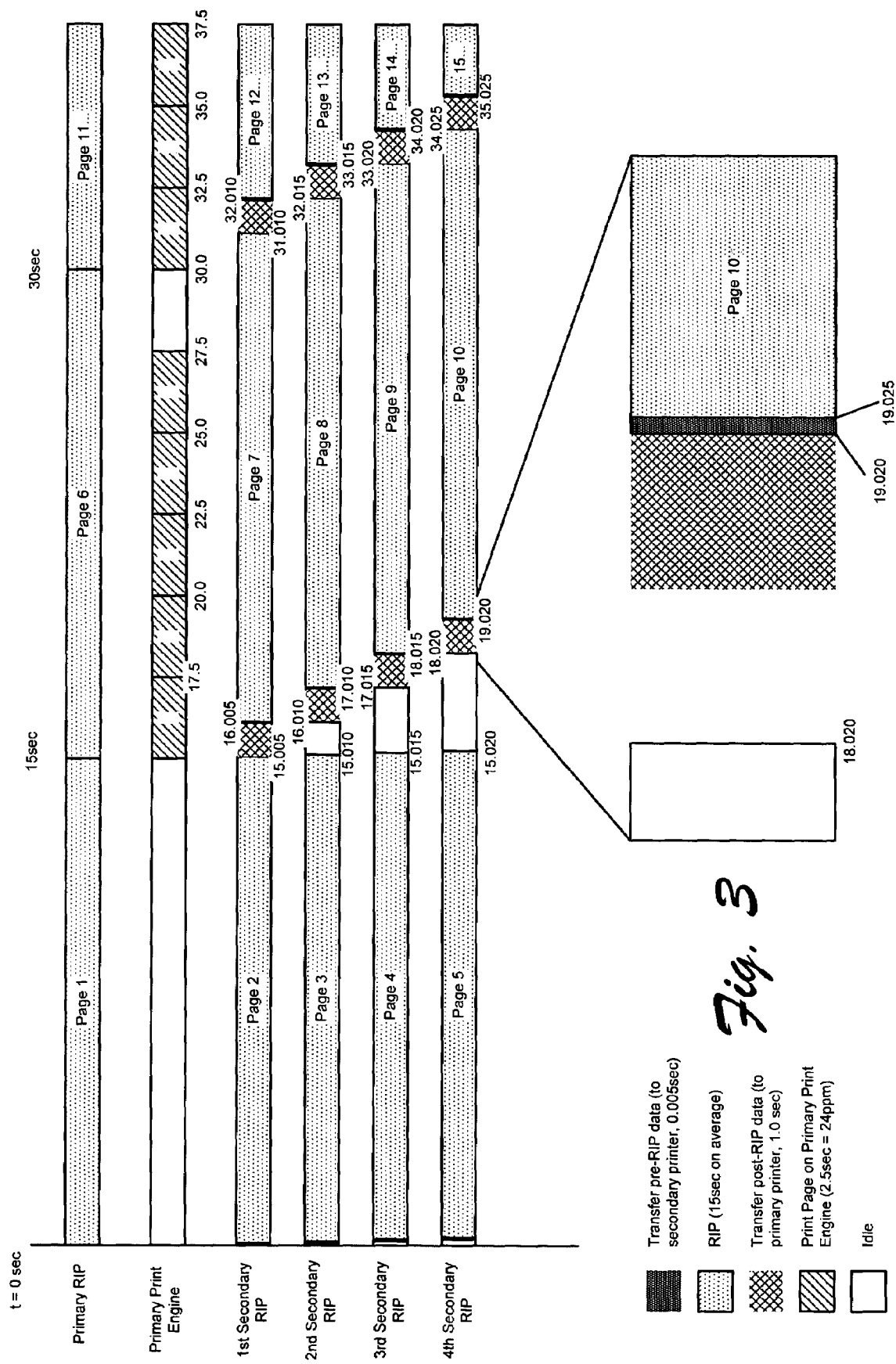
FIG. 3 shows exemplary objective criteria indicating that if too few secondary printers are utilized to assist the primary printer in rasterizing a particular print job, the primary printer's print engine will likely stall (i.e., starve for raster bits to print).

FIGS. 2-6 are now discussed to illustrate various exemplary techniques that the primary printer 106-1 uses to evaluate objective criteria (e.g., RIPtimes, PrintEngineTimes, IdleTimes, transmit and receive times, etc) to determine how many, if any, secondary printers 106-2 through 106-N to utilize for rasterizing assistance. For purposes of discussion, the features of FIGS. 2-6 are discussed in reference to the components of FIG. 1. Additionally, all calculations described with respect to FIGS. 2-6 are in consideration that entire pages of a print job 108 are sent and received in the raster buffer 114 before operations of the primary printer 106-1 continue. For instance, FIGS. 2 and 3 illustrate the following criteria: a RIPtime of fifteen (15) seconds per page and a PrintEngineTime of two-point-five (2.5) seconds. FIG. 2 shows an example where the transmit time (from the primary printer to a secondary printer) of the pre-RIP (un-rasterized) print data is 0.005 seconds. The receive time (from a secondary printer to the primary printer) of the post-RIP (rasterized) print data is one (1) second. In the example of FIG. 2, plugging these values into equation no. 2 indicates that five (5) secondary printers would keep the primary print engine 112 from going into a stall situation.

FIG. 3 shows exemplary objective criteria indicating that if too few secondary printers (one or more of the secondary printers 106-2 through 106-N of FIG. 1) are utilized to assist a primary printer in rasterizing a particular print job, that the primary printer's print engine will likely stall. In this example, if only four (4) secondary printers are used to assist the primary printer with rasterizing the print job, a stall situation will likely be encountered between pages five (5) and six (6) of the print job. Upon detecting the potential for such a scenario, the primary printer 106-1 may select a different, more optimal number of secondary printers to assist in the rasterizing process. In scenarios wherein the transmit time (from primary printer to a secondary printer) of the un-rasterized data plus the receive time (from a secondary printer to the primary printer) of the post-RIP data is greater than the print engine time, then some number of secondary printers can help minimize the stall time. However, at some point, too many secondary printers can cause network traffic jams that reduce the effectiveness of the secondary printers. The basic formula for determining the number of secondary printers when the transfer time plus the receive time is greater than the print engine time is:

$$SecondaryPrinterCount = \left\lfloor \frac{RIPTimeForASinglePage}{TransferTime + ReceiveTime} \right\rfloor. \quad (3)$$

For instance, given a RIP time of fifteen (15) seconds, a pre-RIP time of one-half (0.5) seconds, a post-RIP time of three (3.0) seconds, then the substantially optimal number of secondary printers would be (15/(0.5+3.0))=4.

Figure 4:
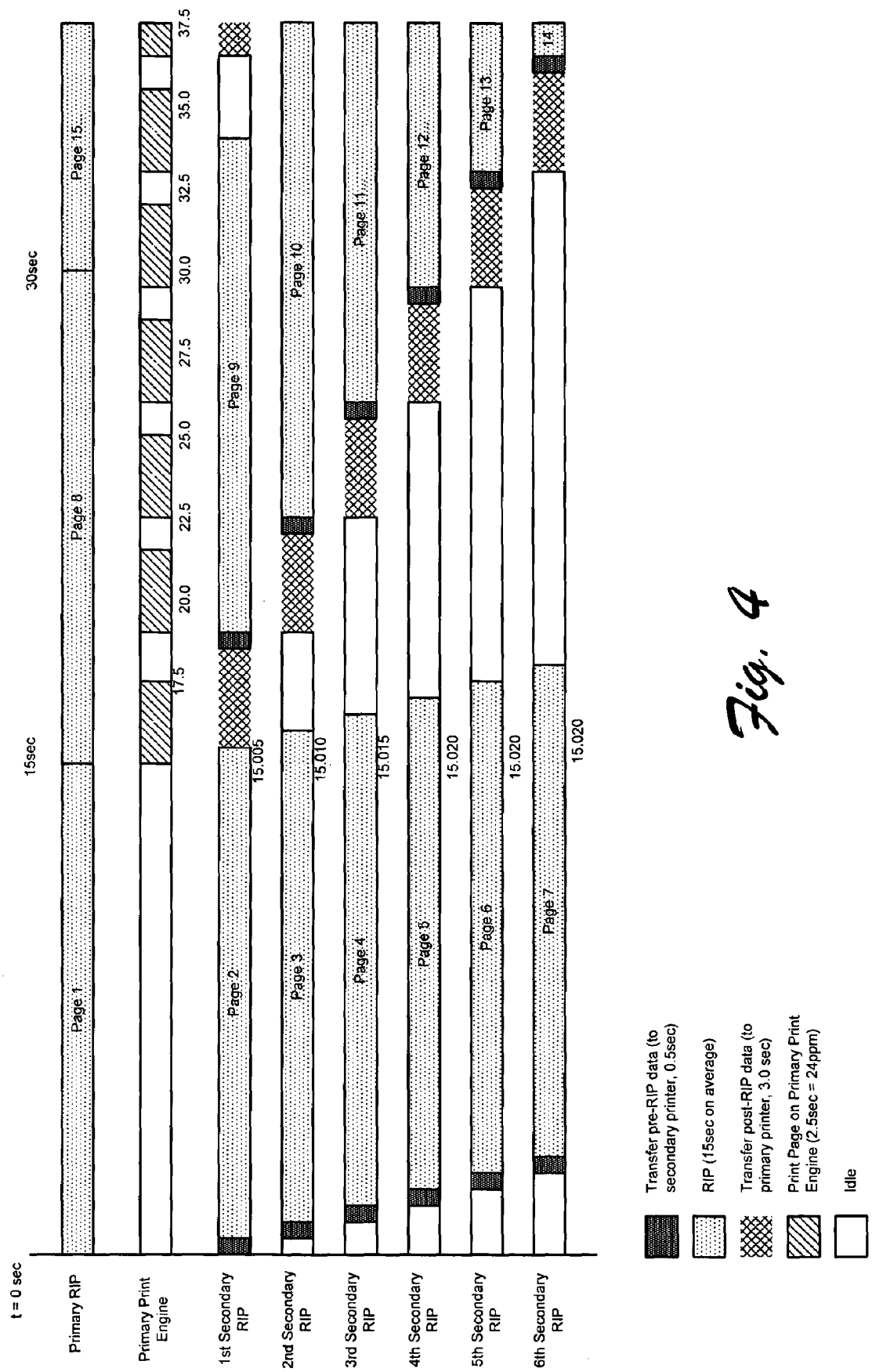
FIG. 4 shows exemplary objective criteria evaluated by a primary printer to determine when enlisting the assistance of too many secondary printers may not be advantageous, but may instead cause network bandwidth data throughput problems.

FIG. 4 shows exemplary objective criteria evaluated by a primary printer 106-1 to determine when enlisting the assistance of too many secondary printers (one or more of the secondary printers 106-2 through 106-N of FIG. 1) may not be advantageous, but may instead cause network bandwidth data throughput problems. Based on such objective criteria, the primary printer would most likely represent a network bottleneck for data packets, since selected secondary printers may end up pacing each other off in attempts to get raster bits to the primary printer. This is evidenced via a network conflict between the 6th secondary printer's RIP and the 1st secondary printer's RIP. By the time the 6th secondary printer has the opportunity to send the post-RIP data back to the primary printer, the RIP on the primary printer and the 1st secondary printer have finished. This indicates that additional secondary printers beyond the 5th secondary printer would not effectively help to minimize any stalling potential. Upon detecting such a scenario, the primary printer 106-1 may reduce the number of secondary printers 106-2 through 106-N accordingly.

Figure 5:
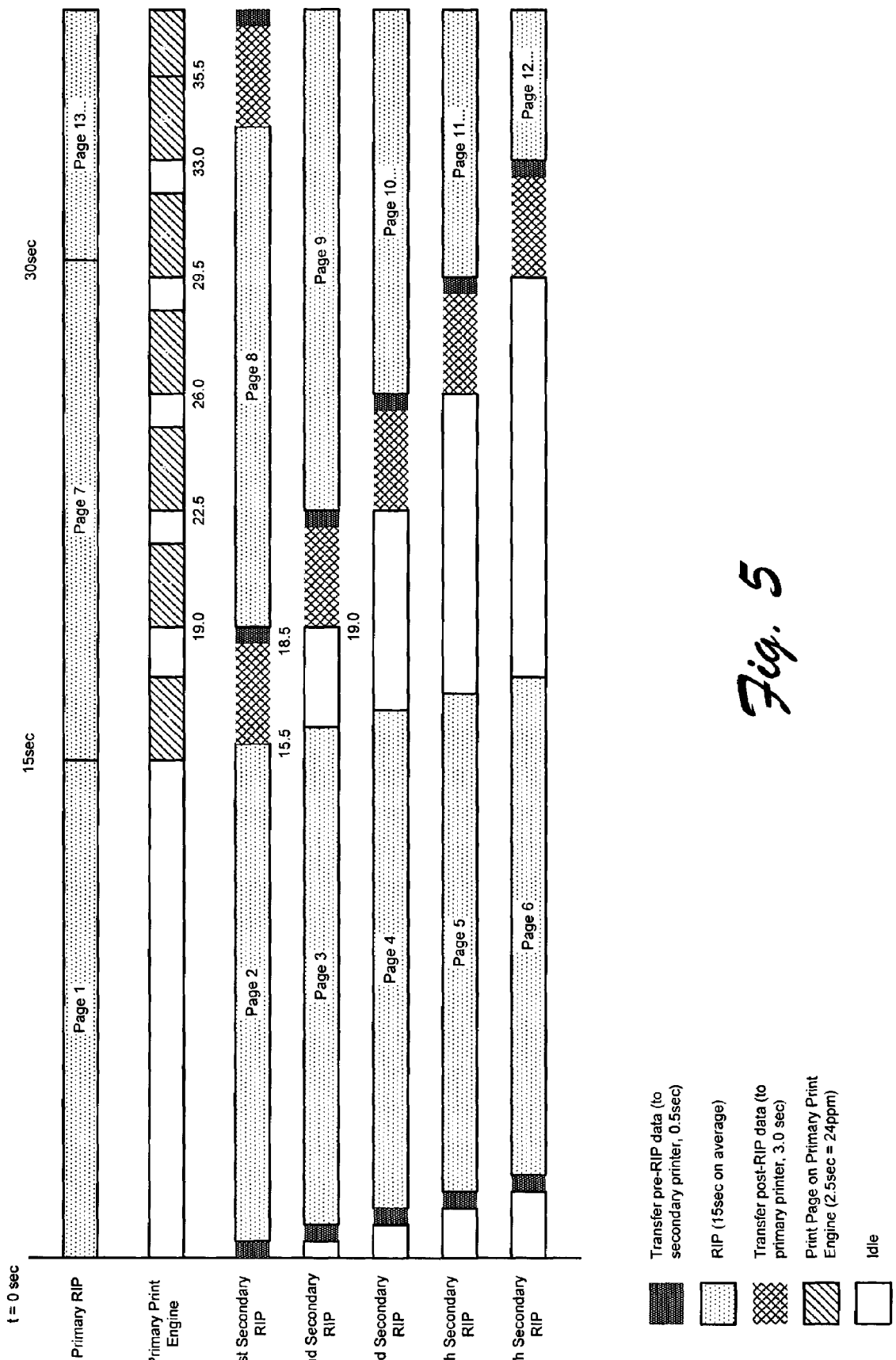
FIG. 5 illustrates exemplary objective criteria used by the primary printer to determine the primary printer's printing operations will be faster if one of the selected secondary printers is not utilized—even thought the selected number of secondary printers does not result in a prohibitive number of network collisions.

FIG. 5 illustrates exemplary objective criteria used by the primary printer 106-1 to determine the primary printer's printing operations will be faster if one of the selected secondary printers is not utilized—even thought the selected number of secondary printers does not result in a prohibitive number of network collisions. In one implementation, any network data throughput issues resulting from too many network data packet collisions can be resolved by adding additional network cards and/or processor(s) to primary printer resources. In particular, this example shows that 5 selected secondary printers do not result in prohibitive network collisions. Yet, the primary printer also determines from the criteria illustrated in FIG. 5 that by the time the $5^{th}$ secondary printer has finished transmitting the post-RIP data back to the primary printer for page 6, the RIP on the primary printer could have finished the page. In view of such a determination, the primary printer 106-1 may determine that reducing the number of secondary printers would result in faster printing of the print job 108.

Figure 6:
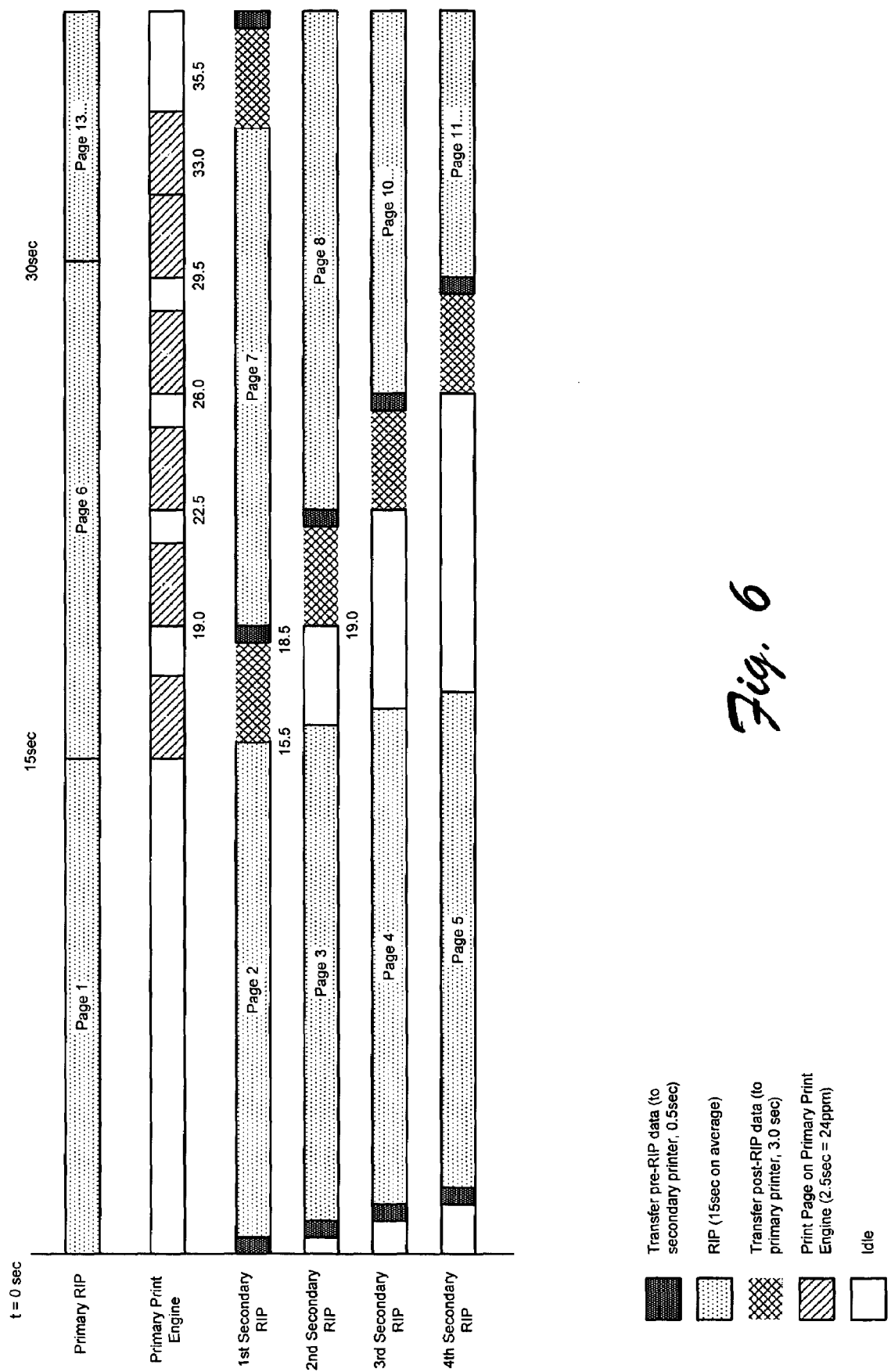
FIG. 6 shows exemplary objective criteria evaluated by a primary printer to arrive at a substantially optimal number of secondary printers for cooperative rasterization of print data in an enterprise network.

FIG. 6 shows exemplary objective criteria evaluated by a primary printer 106-1 to arrive at a substantially optimal number of secondary printers for cooperative rasterization of print data in an enterprise network. In particular, the primary printer selects 4 secondary printers 106-2 through 106-N in view of the illustrated criteria. This particular number of secondary printers has been determined in view of the illustrated criteria to provide substantially optimal support to minimize print engine 112 stall time. As illustrated, the four (4) selected secondary printers have been determined to not cause prohibitive network data throughput problems as a result of network data transfers. The substantially optimal number of secondary printers can be determined via equation no. 3 that provides for finding a set of secondary printers to minimize potential stall conditions at the primary printer.

FIGS. 2-6 show only a single network connection to the primary printer and any one of the secondary printers 106-2 through 106-N at any given point in time. In reality, multiple connections will be made simultaneously. Effectively, the bandwidth is the same in either case. The same amount of data needs to be transmitted whether a single connection has 100% of the bandwidth or whether 5 connections have 20% each. Showing a single connection at any given point in time simplifies the calculations without impacting the results.

Communicating Pre-RIP'd Data to a Secondary Printer

For purposes of discussion, each of the following described operations (e.g., receiving, rasterizing, transmitting, etc.) performed by a secondary printer 106-2 through 106-N are implemented by an analog of the CPM 109 that is shown with respect to printer 106-1. Thus, a respective CPM implements both primary and secondary-printing operations.

At this point, the primary printer 106-1 (see, FIG. 1) has determined that one or more secondary printers can beneficially assist the primary printer with its rasterizing operations. The primary printer has also identified the specific one(s) of the secondary printers that will provide such assistance. In one implementation, the specific one(s) can be chosen as function of factors such as printer availability, current and/or anticipated processing workloads, printer processing/memory resources, etc., in addition to the objective criteria already discussed above. The primary printer's CPM 109 transmits respective un-rasterized portion(s) (e.g., one or more pages) of the print job 108 and respective page assignment(s) 120 over the communication path 102 to each of the selected secondary printers. Each page assignment 120 indicates the respective print job portion(s) to be RIPed by the secondary printer.

Cooperatively RIPing Data for Printing at the Primary Printer

Responsive to receiving a page assignment 120, the secondary printer RIPs the specified print job portion into rasterized bits 122 (FIG. 1), and transmits the rasterized bits to the primary printer 106-1. Responsive to receiving rasterized bits 122, the primary printer 106-1 pushes (appends) the rasterized bits 122 into the raster buffer 114 (FIG. 1) where they are ready to be consumed by the primary printer's print engine 112.

In this manner, the primary printer's CPM 109, responsive to detecting a potential raster buffer 114 underflow condition, acquires print job 108 rasterizing assistance from at least one secondary printer 106-2 through 106-N. Even though the print job is rasterized by multiple printers, the resulting raster bits are only printed by a single printer, the primary printer (i.e., the printer to which the print job was originally sent for printing). In this manner, the system 100 of FIG. 1 provides for cooperative rasterization of print data in an enterprise network.

An Exemplary Printer Architecture

As shown in the exemplary computing environment 100 of FIG. 1, each printer 106-1 through 106-N includes an analog of the following components, which for purposes of illustration are shown and described in reference to printer 106-1. For instance, printer 106-1 includes a processor 124 coupled across a bus 126 to a system memory 128. The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

System memory 128 includes a variety of computer readable media. Such media may be any available media that is accessible by the printer 106-1 and it includes both volatile and non-volatile media, removable and non-removable media. In particular, the system memory includes computer-readable media in the form non-volatile memory, such as read-only memory (ROM), and/or volatile memory, such as random access memory (RAM). The printer may further include other removable/non-removable, volatile/non-volatile computer storage media (not shown) such as a hard disk drive, a CD-ROM, a magnetic tape drive, and so on.

A RAM portion of the system memory 128 contains program modules 130 and program data 132 that are immediately accessible to and/or presently being operated on by the processor 124. For instance, the program modules includes a RIP module 110 to implement cooperative rasterizing of a print job 108 in the enterprise environment 100, print engine 112 to print device ready raster bits, and other modules 134 such as an operating system (OS) to provide a runtime environment, one or more device drivers, and so on. The program data includes, for example, raster buffer 114 for storing raster bits, criteria 116, and other data 136 such as a user interface (UI) for configuring the printer alias table of criteria 116, and/or the like.

An administrative entity may provide commands and information into a printer 106-1 through 106-N via one or more input devices 138 such as a keyboard, a keypad, a pointing device such as a "mouse", and so on. Other input devices may include a microphone, satellite dish, serial port, etc. These and other input devices are connected to the processing unit 124 through an input interface (not shown) coupled to the bus 126, but may be connected by other interface and bus structures, such as a parallel port, or a universal serial bus (USB).

An Exemplary Procedure

FIGS. 7-10 show an exemplary procedure 700 to cooperatively rasterize print data in an enterprise network. For purposes of discussion, operations of the exemplary procedure of FIGS. 7-10 are described while referring to various features of FIG. 1. As a convention when discussing FIGS. 7-10 and when referring to one of the program modules 130 such as the CPM 109, or program data 132 such as the raster buffer 114, the procedure is referring to a program module or program data of the primary printer 106-1, unless otherwise stated.

Figure 7:
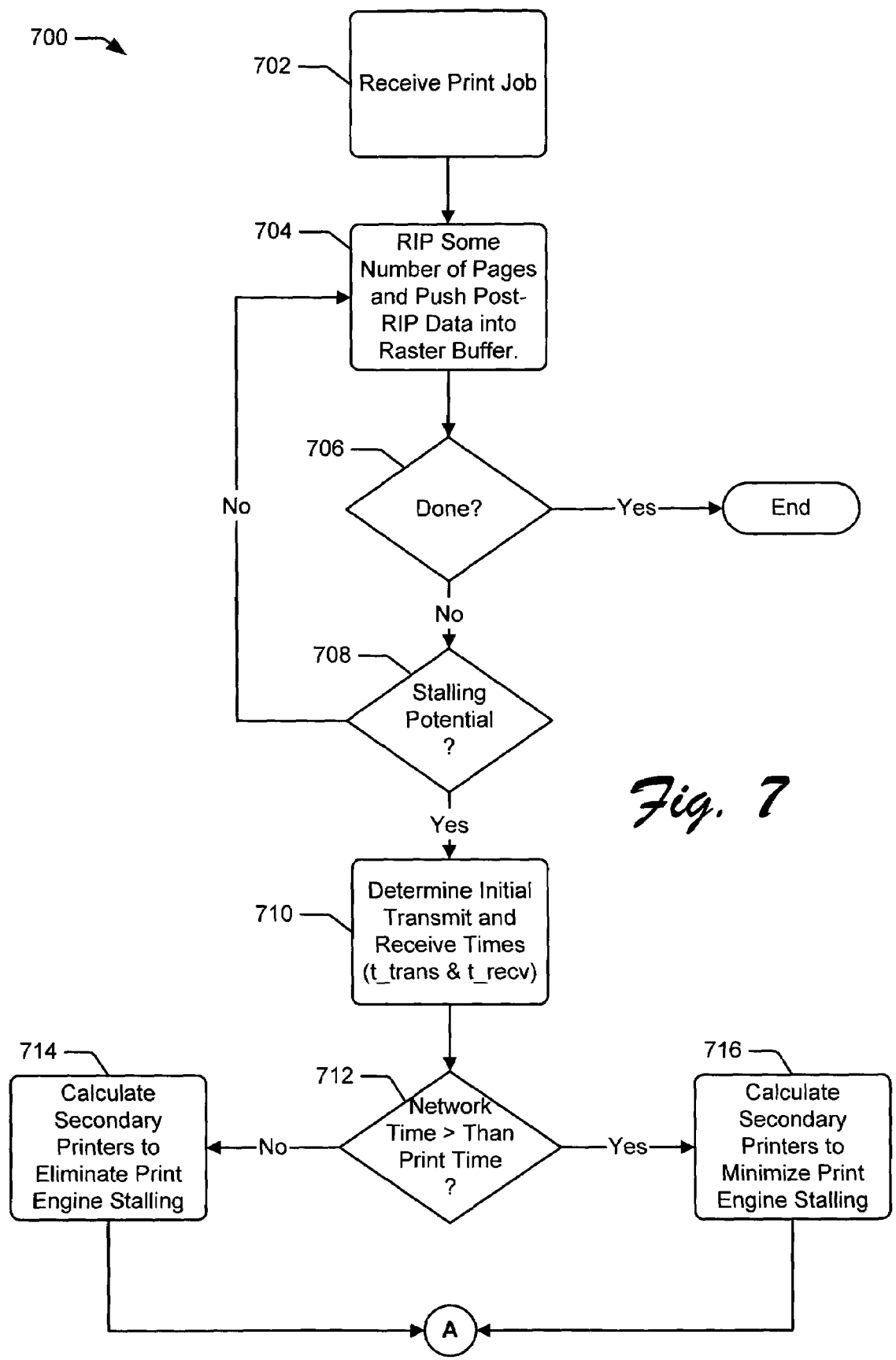
FIGS. 7-10 show an exemplary procedure to cooperatively rasterize print data in an enterprise network. In particular.

Referring to FIG. 7, there is an exemplary procedure for a primary printer 106-1 to determine whether it is advantageous to utilize at least one secondary printer 106-2 through 106-N to assist in rasterizing a print job 108. At block 702, a printer 106-1 receives the print job 108. Since the printer was targeted to print the print job, the printer is referred to as the "primary printer". At block 704, the primary printer's RIP module 110 begins to RIP some "number" of pages of the print job, thereby pushing raster bits into its raster buffer 114. The number of pages is a configurable parameter that can be adjusted over time to improve results. As pages are being rasterized, the CPM 110 records the time to RIP each page (RIPtime), the un-rasterized size of each page, and the post-RIP size of each page. For this operation, only the primary printer (i.e., where the job was originally submitted) is rasterizing pages.

At block 706, the primary printer's CPM 110 determines whether the print job 108 has completed printing. If so, the process ends. Otherwise, the process continues at block 708, wherein the CPM determines whether the print engine 112 runs the potential of starving for raster bits in the raster buffer 114. Basically, this determination is a calculation of whether the average amount of time that the rasterizing module 110 takes to RIP time a single page is greater than the time the print engine module 112 takes to print a single page. If this is not the case, then the procedure continues at block 704, as discussed above. Otherwise, the procedures continues at block 710, wherein the CPM estimates the amount of time that it would take to transmit an average size page of the print job 108 to a secondary printer 106-2 through 106-N (e.g., t_trans=average pre-RIP size/average network speed).

At block 710, the CPM fuirther estimates the amount of time for the secondary printer to return an average post-rasterized page (i.e., a page of raster bits) back to the primary printer (e.g., t_recv=average post-RIP size/average network speed). At block 712, the CPM then determines whether the network time is greater than the amount of time (print time) that it would take the primary printer to RIP and print an average sized print job page (e.g., network time=t_trans+ t_recv). Is the time to transfer the pre and post-RIP data (for a single page) between a secondary printer greater than the time to print a single page? If it is, we can never eliminate stalling with secondary printer support, but we can minimize it. If the network time is less than the print time, we can eliminate stalling altogether.

In view of this, if the operation of block 712 indicates that the network time is not greater than the amount of time (print time) that it would take the primary printer to RIP and print an average sized print job page, the procedure continues at block 714, wherein the CPM calculates the number of secondary printers n to utilize to eliminate any stalling at the print engine 112 as follows in equation (2):

$$n=\text{ceiling}((\text{average RIP time}-\text{engine print time})/\text{engine print time}).$$

Otherwise, the procedure continues at block 716, wherein the CPM calculates the number of secondary printers n to utilize to minimize stalling at the print engine 112 as shown in equation (3) following:

$$n=\text{floor}(\text{average RIP time}/(t\_trans+t\_recv)).$$

Figure 8:
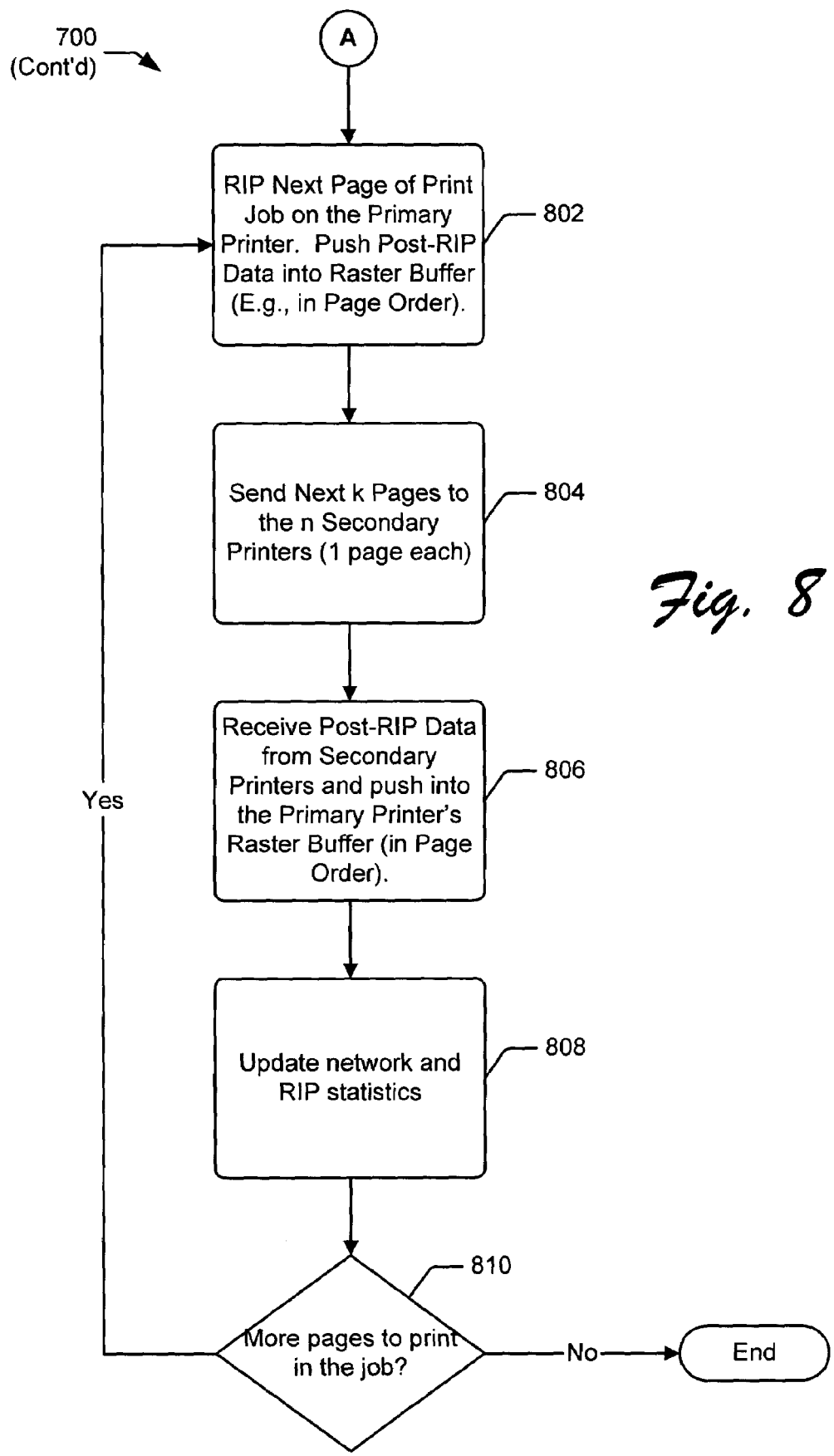

Subsequent to the operations of either block 714 or 716, the procedure continues at block 802 of FIG. 8, as illustrated by on-page reference "A".

FIG. 8 shows further aspects of the exemplary procedure 700 of FIG. 7 to cooperatively rasterize print data in an enterprise network. In particular, at block 802, the primary printer 106-1 (i.e., the RIPing module 110) RIPs a next page of the print job 108, subsequently pushing the corresponding raster bits into the raster buffer 114. At block 804, the primary printer send the next n pages to the n secondary printers (i.e., one or more of the secondary printers 106-2 through 106-N). (n was calculated above with respect to blocks 714 and 716 of FIG. 7. At block 806, responsive to receiving rasterized ("RIP'd") data 122 from a secondary printer, the primary printer pushes the RIP'd data 122 into the raster buffer 114 for printing by the print engine 112. At block 808, the procedure updates the network and RIP statistics (see "other data" 136 of FIG. 1) to reflect the actual network transfer and receive times, size of the RIP'd data 122, and so on. At block 8010, the procedure determines if there are additional pages of the print job to RIP, if so, the procedure continues at block 802, as described above. Otherwise, the procedure is complete.

Figure 9:
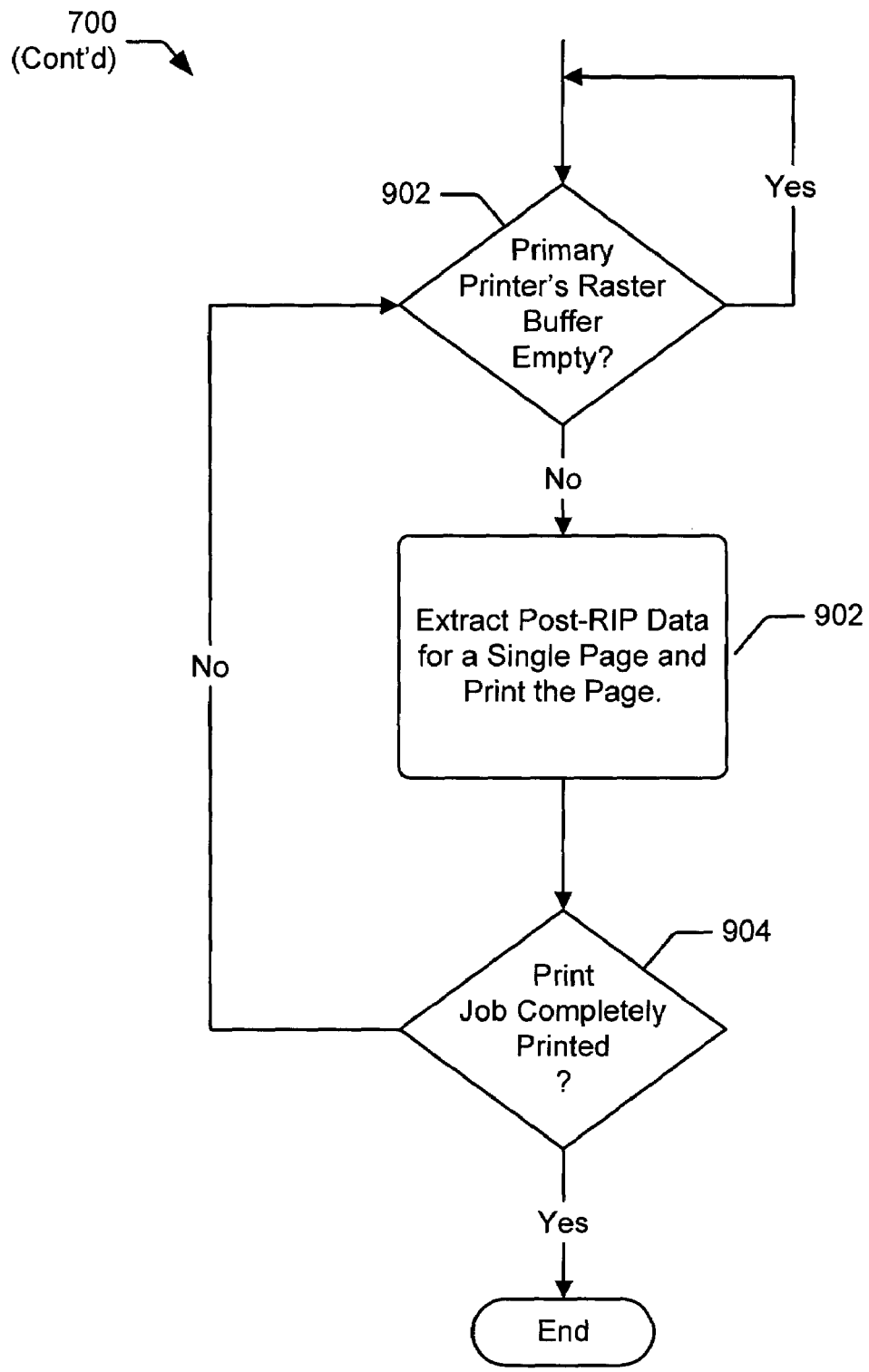

FIG. 9 shows further aspects of the exemplary procedure 700 of FIG. 7 to cooperatively rasterize print data in an enterprise network. In particular, FIG. 9 shows the operations of the print engine 112 of the primary printer 106-1. These operations are performed in parallel to other operation of the procedure 700. At block 902, the print engine determines if the raster buffer 114 is empty of post-RIP'd data (i.e., raster bits). If so, the procedure for the print engine continues at block 902, wherein the print engine essentially waits for raster bits to show-up in the raster buffer. Otherwise, at block 904, the print engine extracts a page of raster bits from the raster buffer and prints the page. At block 906, the print engine determines of the print job 108 has finished (i.e., been entirely printed). If not, the procedure continues at block 902 as discussed above. Otherwise, the print engine procedure ends.

Figure 10:
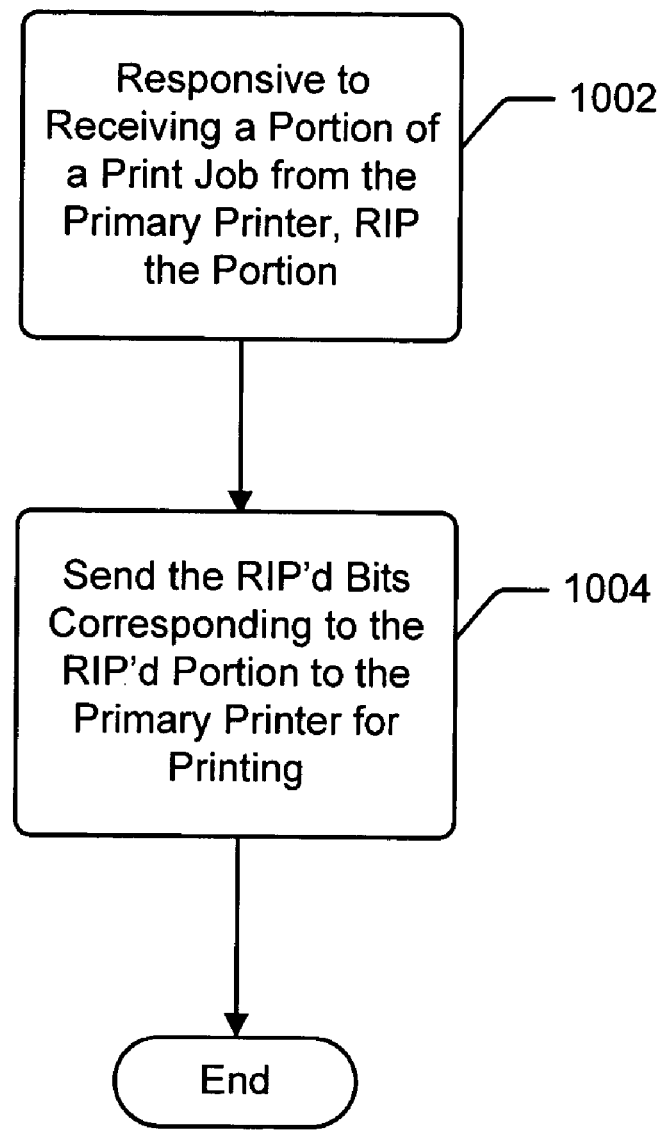

FIG. 10 shows further aspects of the exemplary procedure 700 of FIG. 7 to cooperatively rasterize print data in an enterprise network. In particular, FIG. 10 shows the operations of a secondary printer (one of the printers 106-2 through 106-N) to cooperatively RIP a portion of a print job 108 for subsequent insertion into a primary printer's raster buffer 114. These operations are performed in parallel to other operation of the procedure 700. At block 1002, and responsive to receiving a portion (e.g., a page) of the print job 108 from the primary printer 106-1, RIPs the portion. At block 1004, the secondary printer sends the RIP'd data 122 to the primary printer for printing.

Conclusion

The described systems and methods cooperatively rasterize print data in an enterprise network. Although the systems and methods have been described in language specific to structural features and methodological operations, the subject matter as defined in the appended claims are not necessarily limited to the specific features or operations described. Rather, the specific features and operations are disclosed as exemplary forms of implementing the claimed subject matter.

The invention claimed is:

1. A method for cooperative rasterization of print data in an enterprise network, the enterprise network including multiple printers, the method comprising:
   rasterizing, by a primary printer of the multiple printers, a portion of a print job to input raster bits into a raster buffer associated with the primary printer;
   determining a time taken to rasterize the portion of the print job;
   identifying, by the primary printer, a potential underflow condition of the raster buffer, the potential underflow condition occurring if the determined time taken to RIP the portion of the print job is greater than a time that will be taken by the primary printer to print the portion of the print job;
   determining a transit time a secondary printer takes to receive a portion of the print job and determining a receive time it takes the secondary printer to return the corresponding raster data to the primary printer;
   using the transit time and the receive time to determine secondary printers to be used for rasterizing a portion of un-rasterized portions of the print job for subsequent addition to the raster buffer;
   responsive to identifying, the primary printer communicating an un-rasterized portion of the print job to the secondary printer for the secondary printer to rasterize, the primary printer not rasterizing the un-rasterized portion;
   receiving, by the primary printer, raster bits corresponding to the un-rasterized portion from the secondary printer; and
   printing, by the primary printer, all raster bits corresponding to the print job.

2. A method as recited in claim 1, wherein identifying further comprises:
   evaluating, by the primary printer, whether communicating the un-rasterized portion to the secondary printer would at least minimize the potential underflow condition; and
   only performing the communicating if the evaluating indicates that operations of the secondary printer to assist the primary printer in its rasterization operations would at least minimize the potential underflow condition.

3. A method as recited in claim 2, wherein evaluating further comprises determining objective criteria comprising respective amounts of time for:
   the primary printer to transmit the un-rasterized portion to the secondary printer, the secondary printer to rasterize the un-rasterized portion, and the primary printer to receive the raster bits from the secondary printer.

4. A method as recited in claim 3, wherein the respective amounts of time are based on data persisted by the primary printer.

5. A method as recited in claim 2, wherein evaluating further comprises determining, by the primary printer, that operations of the secondary printer to assist the primary printer in its rasterization operations would eliminate the potential underflow condition.

6. A method as recited in claim 1, wherein the method further comprises:
   responsive to identifying, the primary printer calculating a number of secondary printers of the multiple printers to communicate respective un-rasterized portions of the print job to respectively rasterize, the secondary printer being included in the number, the un-rasterized portion being included in the respective unrasterized portions;
   not rasterizing, by the primary printer, any of the respective un-rasterized portions;
   wherein communicating further comprises, the primary printer sending the un-rasterized portions to respective ones of the number of secondary printers; and
   wherein receiving further comprises, receiving, by the primary printer, raster bits corresponding to the respective un-rasterized portions from respective ones of the number of secondary printers.

7. A method as recited in claim 6, wherein sending and receiving at least minimizes the potential underflow condition.

8. A method as recited in claim 6, wherein sending and receiving eliminates the potential underflow condition.

9. A method as recited in claim 6, further calculating the number of secondary printers further comprises determining the number according to the following:

$$SecondaryPrinterCount = \left\lceil \frac{RipTime - PrintEngineTime}{PrintEngineTime} \right\rceil.$$

10. A method as recited in claim 6, further calculating the number of secondary printers further comprises determining the number according to the following:

$$SecondaryPrinterCount = \left\lfloor \frac{RIPTime \text{ for a Single Page}}{\text{Transfer Time} + \text{Receive Time}} \right\rfloor.$$

11. A computer-readable medium comprising computer-program instructions executable by a processor coupled to the computer-readable medium, the computer-program instructions comprising instructions for performing the method as recited in claim 1.

12. A computer-readable media comprising computer-program instructions for cooperative rasterization of print data in an enterprise network, the enterprise network including multiple printers, the computer-program instructions comprising instructions for:
   rasterizing, by a primary printer of the multiple printers, a portion of a print job to input raster bits into a raster buffer associated with the primary printer;
   determining a time taken to rasterize the portion of the print job;
   identifying, by the primary printer, a potential underflow condition of the raster buffer, the potential underflow condition occurring if the determined time taken to RIP the portion of the print job is greater than a time that will be taken by the primary printer to print the portion of the print job;
   determining a transit time a secondary printer takes to receive a portion of the print job and determining a receive time it takes the secondary printer to return the corresponding raster data to the primary printer;
   using the transit time and the receive time to determine secondary printers to be used for rasterizing a portion of un-rasterized portions of the print job for subsequent addition to the raster buffer; and
   responsive to identifying:
   evaluating, by the primary printer, whether communicating the un-rasterized portion to the secondary printer would at least minimize the potential underflow condition; and
   if the evaluating indicates that operations of the secondary printer to assist the primary printer in its rasterization operations would at least minimize the potential underflow condition, communicating the un-rasterized portion to the secondary printer for the secondary printer to rasterize, the primary printer not rasterizing the un-rasterized portion, the primary printer being configured to receive and print raster bits corresponding to the un-rasterized data.

13. A computer-readable medium as recited in claim 12, wherein the computer-program instructions further comprise instructions for:
   receiving, by the primary printer, raster bits corresponding to the un-rasterized portion from the secondary printer; and
   printing, by the primary printer, all raster bits corresponding to the print job.

14. A computer-readable medium as recited in claim 12, wherein evaluating further comprises instructions for determining objective criteria comprising respective amounts of time for: the primary printer to transmit the un-rasterized portion to the secondary printer, the secondary printer to rasterize the un-rasterized portion, and the primary printer to receive the raster bits from the secondary printer.

15. A computer-readable medium as recited in claim 12, wherein evaluating further comprises determining, by the primary printer, that operations of the secondary printer to assist the primary printer in its rasterization operations would eliminate the potential underflow condition.

16. A computer-readable medium as recited in claim 12, wherein the computer-program instructions further comprise instructions for:
   calculating a number of secondary printers of the multiple printers to communicate respective un-rasterized portions of the print job to respectively rasterize, the secondary printer being included in the number, the un-rasterized portion being included in the respective unrasterized portions;
   not rasterizing, by the primary printer, any of the respective un-rasterized portions;
   communicating the primary printer sending the un-rasterized portions to respective ones of the number of secondary printers;
   receiving, by the primary printer, raster bits corresponding to the respective un-rasterized portions from respective ones of the number of secondary printers; and
   printing, by the primary printer, all raster bits corresponding to the print job.

17. A computer-readable medium as recited in claim 16, wherein the instructions of calculating the number of secondary printers further comprises:
   determining a rasterization time (RIPtime) to rasterize a portion of the un-rasterized portions;
   determining a transmit time to send the portion to a secondary printer of the secondary printers;
   determining a receive time for the primary printer to receive raster bits corresponding to the portion from the secondary printer;
   resolving that the transmit time plus the receive time is greater than an amount of time (PrintEngineTime) that the primary printer would take to print a single page of the print job; and
   responsive to resolving, formulating the number of secondary printers according to the following:

$$SecondaryPrinterCount = \left\lceil \frac{RIPtime - PrintEngineTime}{PrintEngineTime} \right\rceil.$$

18. A computer-readable medium as recited in claim 16, wherein the instructions of calculating the number of secondary printers further comprises:
   determining a rasterization time (RIPtime) to rasterize a page of the un-rasterized portions;
   determining a transmit time to send the page to a secondary printer of the secondary printers;
   determining a receive time for the primary printer to receive raster bits corresponding to the page from the secondary printer;
   resolving that the transmit time plus the receive time is greater than an amount of time (PrintEngineTime) that the primary printer would take to print raster bits corresponding to a single page of the print job; and responsive to resolving, formulating the number of secondary printers according to the following:

$$SecondaryPrinterCount = \left\lfloor \frac{RIPtime}{\text{transfer time} + \text{receive time}} \right\rfloor.$$

19. A computing device for cooperative rasterization of print data in an enterprise network, the enterprise network comprising a primary printer and at least one secondary printer, the computing device comprising:
   a processor; and
   a memory coupled to the processor, the memory comprising computer-program instructions executable by the processor, the computer-program instructions comprising instructions for:
   rasterizing a portion of a print job to input raster bits into a raster buffer associated with the primary printer;
   determining a time taken to rasterize the portion of the print job;
   identifying a potential underflow condition of the raster buffer, the potential underflow condition occurring if the determined time taken to RIP the portion of the print job is greater than a time that will be taken by the primary printer to print the portion of the print job;
   determining a transit time a secondary printer takes to receive a portion of the print job and determining a receive time it takes the secondary printer to return the corresponding raster data to the primary printer;
   using the transit time and the receive time to determine secondary printers to be used for rasterizing a portion of un-rasterized portions of the print job for subsequent addition to the raster buffer;
   responsive to identifying:
   sending, by the primary printer, an un-rasterized portion of the print job to a secondary printer in the enterprise;
   receiving, by the primary printer, associated raster bits from the secondary printer, the associated raster bits having been generated by the secondary printer from the un-rasterized portion; and
   responsive to receiving, inserting, by the primary printer, the associated raster bits into the raster buffer such that raster buffer underflow conditions are avoided at the primary printer.

20. A computing device as recited in claim 19, wherein the computer-program instructions further comprise instructions for:
   evaluating in view of anticipated raster buffer underflow whether the primary printer will complete printing the print job faster than if the secondary printer assists the primary printer to rasterize an un-rasterized portion of the print job; and
   performing the operations of sending, receiving, and inserting only if it has been determined that the primary printer will not print the print job as quickly without rasterizing assistance from the secondary printer.

* * * * *

UNITED STATES PATENT AND TRADEMARK OFFICE
CERTIFICATE OF CORRECTION

PATENT NO. : 7,576,880 B2
APPLICATION NO. : 10/701144
DATED : August 18, 2009
INVENTOR(S) : Robert D. Christiansen et al.

It is certified that error appears in the above-identified patent and that said Letters Patent is hereby corrected as shown below:

In column 15, line 29, in Claim 19, delete "primarv" and insert -- primary --, therefor.

Signed and Sealed this

Twenty-first Day of September, 2010

David J. Kappos
*Director of the United States Patent and Trademark Office*